United States Patent Office 3,039,509
Patented June 19, 1962

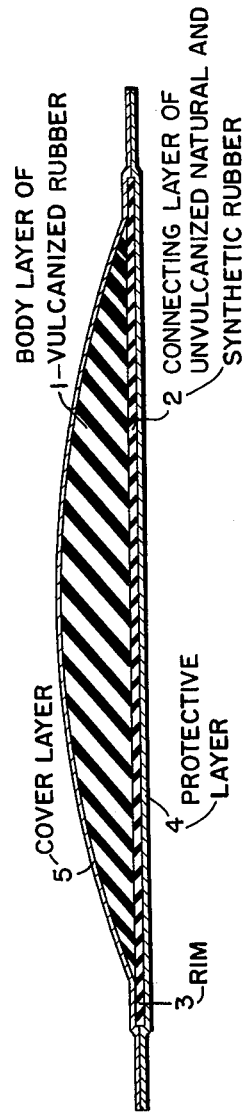

3,039,509
COLD VULCANIZING DRY REPAIR PATCH
Wilhelm Gruber, Munich, Germany, assignor to Stahlgruber Otto Gruber & Co., Munich, Germany
Filed Dec. 28, 1959, Ser. No. 862,051
Claims priority, application Germany July 13, 1959
12 Claims. (Cl. 152—367)

The object of this invention is a multilayer, cold vulcanizing, dry repair patch for rubber articles in which the connecting layer is composed of adhesives which prevent the patch from shifting its position after being applied, the migration of accelerators and overvulcanization caused by heat when the article, such as a vehicle tire for instance, becomes heated in use.

By dry patches or plasters are meant multilayer rubber members of any desired shape, for example, round, rectangular or elongated, for the repair of damaged parts of rubber or rubberized articles, for example vehicle tires and tubes, conveyor belts, rubber boots, inflatable boats, tent awnings and the like. Dry patches and plasters are required to form a firm vulcanized connection with the article to be repaired at relatively low temperatures, e.g. at room temperature, without the use of specially exerted additional pressure or additional heat, it being a particular feature of dry patches and plasters that for their application and connection by vulcanization it is not necessary to use any additional vulcanization promoting means separate from the patches and plasters, for example, no so-called rubber solution or vulcanizing fluid. In accordance with the usual terminology, patches are distinguished from plasters mainly in that the patches have a so-called main body of vulcanized rubber, whereas plasters have additional strengthening inserts in this main body, the inserts generally consisting of cord. As regards their use, patches are generally used for the repair of articles which consist of pure vulcanized rubber, e.g., vehicle tubes, whereas plasters are normally used for repair in those cases in which the article to be repaired has strengthening inserts, e.g., vehicle tires and conveyor belts.

Dry patches and plasters consist of a main body of vulcanized rubber, in some cases with strengthening inserts, and a connecting layer secured to the main body, the function of the connecting layer being to effect connection between the article to be repaired and the patch by vulcanization after application to the damaged plate or connection place.

The invention relates to the formation of the abovementioned multi-layer dry patches or plasters and, in particular, relates to the composition of the connecting layer and its application to the main body.

The single FIGURE in the drawing is a cross section through a repair patch and illustrates the main body layer, the connecting layer, a protective layer arranged over the connecting layer and a covering layer arranged over the main body layer. As shown in this figure and in accordance with this invention the main body layer 1 is of vulcanized rubber while the connecting layer 2 is of unvulcanized natural and synthetic rubber. This connecting layer is arranged on the main body layer and extends substantially beyond the outer periphery of the main body so that a highly elastic or flexible rim 3 is formed. The connecting layer 2 of the patch is provided with a protective layer 4, for example, cellophane, cellulose or a similar material. The body layer or main body 1 is covered with a cover layer 5 of paper, cellulose or similar substance. As known in the art, both the protective layer and the covering layer are removable and the latter is provided to ensure that the patch can be applied to the article being repaired without creasing.

It is known to mix into the connecting layer, which consists essentially of unvulcanized rubber, a high percentage of vulcanizing accelerators in order to reduce the vulcanizing time as much as possible. It is further known in dry patches to make the connecting layer strongly adhesive in order that the patch when applied adheres to the damaged place until vulcanization is completed.

Difficulties have up to now opposed the introduction of so-called dry patches and plasters into practice, these difficulties being encountered above all in cases in which airor gas-filled rubber containers under internal pressure, which undergo heating in normal use, must be repaired. In itself, the heating of the article to be repaired, e.g., the heating which occurs in a vehicle tube or tire during travel of the vehicle, promotes vulcanization, but this effect is not satisfactory when the undesirable phenomenon known as "floating" occurs.

In order to effect satisfactory vulcanization it has previously been thought necessary to admix liquid accelerators with the solid ultra-accelerators in the connecting layer. The admixture of the liquid accelerator on the mixing roll during the manufacture of the connecting layer mixture renders treatment on the roll extremely difficult since the mixture adheres too firmly to the roller and can in no case be drawn into the thin films which represent the connecting layer and are subsequently joined to the main body.

When the patch is used the connecting layer is then too soft and does not adhere sufficiently firmly. At the critical temperatures between 40 and 60° C. the already very soft connecting layer of the patch can become so soft that the patch can shift on the article to be repaired, for example on a vehicle inner tube, particularly if a lateral push is exerted on the patch. This critical temperature of between 40 and 60° C. is always attained during a journey of long duration at present day speeds, even when the external temperature is of the order of 18 to 20° C. Thus "floating" prevents a precise vulcanized connection between the repair article and the main body of the patch or plaster, and this "floating" may even cause the whole of the repair body to slip or slide away from the damaged place. Accordingly, this "floating" has to be regarded as being very dangerous.

A high proportion of accelerators in the connecting layer is necessary, on one hand in order to bring about vulcanization as quickly as possible, as is necessary for the firm connection of the patch with the repaired article in cold vulcanizing processes, but on the other hand, as has been shown in practice, a high proportion of accelerators can easily lead to so-called "over-vulcanization," i.e., the connecting layer of the repair patch ages prematurely and thereby the connection of the repair patch with the repaired article is quite appreciably adversely affected. In this connection it must be realized that relatively little sulphur becomes free from the article being repaired, e.g., a vehicle tube, and that in order to effect vulcanization in a conveniently short time a high proportion of strongly acting accelerator compositions must be incorporated. The interaction of the accelerator compositions with the low proportion of sulphur from the vulcanized vehicle tube and the continuous supply of heat during travel causes over-vulcanization, i.e., the excessive ageing of the connecting layer of the repair patch, which is analogous.

It is known to make the connecting layer as thin as possible in order that the vulcanization throughout it may take place in the shortest possible time and in order that there may be formed between the main body and the article being repaired a soft and resilient boundary layer which is capable of following the movements of the repaired article, for example, the periodic deformations of a vehicle tire when in use. There is a further disadvantage attached to known dry patches in that in the manufacture thereof it is very difficult to connect the very thin connecting layer made from a very strongly adhesive mixture directly to the main body made from vulcanized rubber. However, even when this connection is made, there exists the danger that this will lift from the damaged place after application of the patch or plaster, particularly in the case of patches and plasters which have a rim projecting beyond the periphery of the main body.

For technical reasons associated with manufacture, i.e., in order to enable vulcanization to be effected as quickly as possible in the molding or rolling process, the main body of the patch or plaster is generally made from a mixture which likewise contains a high percentage of accelerators, for example, tetramethylthiuram disulphite. Experience has shown that in the vulcanizing during manufacturing of the main body the whole proportion of accelerator is not always used up without residue, and that the residual parts of unused accelerators have the tendency to migrate towards the connecting layer consisting of unvulcanized rubber. This "migration" is not desired, since it upsets the predetermined proportions of unvulcanized rubber and admixture in the connecting layer and since it causes premature vulcanization before use or, in other words, lowers the storage capacity of the patches and plasters. The plasters and patches should, however, have as long a storage time as possible, at least several years without deterioration in the adhesive and vulcanizing properties of its connecting layer. This storage capacity is also required under unfavorable conditions, for instance, in the tropics.

The present invention overcomes all of the above-described disadvantages and is concerned with a prefabricated multi-layer dry repair body in the form of a patch or plaster for the repair of rubber articles by cold vulcanization, the unvulcanized connecting layer thereof being, on one hand, so strongly adhesive that satisfactory and complete application of the repair body at the start of the repair can be effected simply by pressure and, on the other hand, not too soft so that the above-described disadvantages of "floating" on the repaired article are avoided. The patches and plasters according to the invention, moreover, are such that disadvantageous "migration" of residual accelerators from the main body into the connecting layer is avoided and thereby an improved storage capacity is obtained. Finally, the connecting layer of the patches and plasters is also to be such that it effects in the shortest possible time vulcanization with the rubber article to be repaired without over-vulcanization or over-ageing taking place, even with long and practically continuous supply of heat during travel.

For this purpose, the connecting layer consists in the first place of a basic mixture which consists of unvulcanized natural rubber and unvulcanized synthetic rubber, for example, of mixed polymers on the basis of polybutylene, polychlorobutylene, polymethylbutylene, Butyl rubber or the like, thus the copolymer of isobutylene and isoprene or a copolymer of isobutylene and butadiene, the surprising effect occurring that the plasticity of the connecting layer is reduced to the required necessary value and is not increased upon heating. This effect is to be attributed to the fact that the addition of the synthetic rubber so stiffens the mass that upon heating it does not soften or become too plastic. The quantity of admixed synthetic rubber depends on the nature of the additional material and in particular on how far the additional material itself influences the plasticity as a result of its content of softeners. The synthetic rubber can vary within wide limits and can be from at least 1% up to about 40% by weight, referred to natural rubber.

It has been found particularly advantageous to use synthetic rubber capable of crystallizing, since during the heating it loses its crystalline structure and is therefore particularly suitable for becoming anchored deeply in the pores of the previously roughened surface, becoming firmly anchored in the pores after cooling of the thin rubber film by renewed crystallization.

The connecting layer further contains, in accordance with the invention, as vulcanizing accelerator, a composition of ultra-accelerators and basic accelerators, which are both introduced in the form of a dry double salt and by reason of the dry substance thereof do not soften the connecting layer mixture. The action of the accelerators is increased appreciably due to the solid form of the double salt. It is known that basic accelerators themselves have a very weak action. Due to their combination with ultra-accelerators in the form of a double salt, there is afforded a very much stronger action than would be obtained with ultra-accelerators alone or in combination with a liquid basic accelerator, and much stronger also than would be expected as the sum of both actions. Upon contact of the strongly acting accelerator composition, i.e., of the double salt in the compound with the free sulphur on the roughened damaged surface of the article to be repaired, quite small amounts suffice to bring about vulcanization in a practicable short time.

There has proved as particularly useful double salts which consist of dithiocarbonates and organic alkali, for example a double salt of zinc ethylphenyldithiocarbamate and cyclohexylethylamine. The double salt incorporated as accelerator can be used alone or in combination with other known accelerators.

In order to reduce further the possibility of the undesirable "floating" and in order above all to effect the required degree of complete vulcanization of the connecting layer and to avoid over-vulcanization with certainty, the invention also proposes the admixture of special substances in the connecting layer, these special substances being termed "limiting substances."

Suitable limiting substances are phenolformaldehyde condensation products, in particular of aromatic hydroxyl compounds such as phenols, cresols and diphenylolpropane of the resol or resitol classes. The admixture of the said substance into the connecting layer provides the surprising effect that over-ageing of the connecting layer and defective connection of the repair patch with the rubber article to be repaired, e.g., a vehicle tube, is avoided. Moreover, and likewise surprisingly, there is definitely no softening of the connecting layer, particularly within the crystal temperatures between 40 and 60° C., before the vulcanizing of the repair patch to the article has taken place. Thus, undue softening of the connecting layer and lifting of the patch are avoided with certainty.

In a preferred form of the invention, the admixed condensation resin is phenol resin or cresol resin modified, for example, with terpene. As a plasticizing agent for the condensation resin if terpene is used it is one with at least ten carbon atoms.

A condensation resin admixture of 2 to 10% by weight referred to natural rubber has proved particularly suitable.

As tests have shown, in spite of the above-described effects the vulcanizing action of the accelerators is not reduced.

In addition to the limiting substances there can also be introduced into the connecting layer silicic acid fillers which are also suitable for incorporation together with so-called activators, e.g., zinc oxide. An admixture to the connecting layer of 0.5 to 4% of strengthening silicic acid fillers made from precipitated silicic acid with a small proportion of calcium silicate ($SiO_2$—content approximately 85% and CaO—content approximately 3%) has proved particularly suitable. In this case, also, there has been the surprising unforeseeable effect that even with an additional zinc oxide which itself exerts a plasticizing action and with a high proportion of accelerators, the connecting layer becomes suitably firm and the vulcanizing of this layer throughout is limited at the right moment without the vulcanizing properties of the accelerators being disadvantageously effected.

Moreover, these connecting layers can be exposed to sunlight without harm.

The definite admixtures referred to as limiting substances are not to be compared with the known normal so-called fillers which indeed bring about an increase in the firmness of the finished vulcanized body, but which do not have the above-mentioned properties.

In order to avoid the above-described disadvantage that the adhesive layer which may project beyond the main body of vulcanized rubber, separates therefrom, according to a further feature of the invention a securing layer is provided between the connecting layer and the main body. This likewise consists essentially of unvulcanized rubber, but made from a mixture comprising relatively dry, short threads, and upon deformation of the repaired article it affords an equalization of tension which prevents lifting of the main body. This securing layer is likewise a connecting layer, since it consists of unvulcanized rubber, but it can easily be applied by vulcanization for the following reasons.

In addition to the problem of preventing the lifting of the connection layer from the main body, the securing layer has the further task of preventing during manufacture of the patch or plaster vulcanizing together of the main body with a part of the very thin long-fibred connecting layer. Since the connecting layer is extremely thin, this would mean in practice that when employing the prefabricated patch the connecting layer would no longer be available, at least to some extent. Applicant has found that with a mixture of 0.3 to 1.5 tetramethylthiuram disulphide in the securing layer which in the manufacture of the patch results in vulcanizing on but not vulcanizing through, migration of residual accelerators from the main body into the connecting layer is prevented so that this connecting layer has a practically unlimited storage life.

An example of the ranges in the composition of the connecting layer is:

| | Percent |
|---|---|
| Unvulcanized synthetic rubber | 0.5–40 |
| Double salt of zinc ethylphenyldithiocarbamate and cyclohexyl ethyl amine | 15 to 50 |
| Synthetic resin | 0.75 to 10 |
| Zinc oxide | 2–5 |
| Silicic acid, precipitated | 0.5–4 |

The ranges are based on the total quantity of natural rubber
Balance—unvulcanized rubber Specific examples of suitable compositions of the connecting layer are as follows:

*Example 1*

| | Parts |
|---|---|
| Rubber | 100 |
| Synthetic rubber | 20 |
| Softener | 1 |
| Zinc oxide, active | 5 |
| Double salt (as in the general example above) | 35 |
| Phenol formaldehyde | 0.75 |

*Example 2*

| | Parts |
|---|---|
| Rubber | 100 |
| Synthetic rubber | 20 |
| Softener | 1 |
| Zinc oxide, active | 5 |
| Double salt (as above) | 30 |
| Cresol formaldehyde resin | 2 |

*Example 3*

| | Parts |
|---|---|
| Rubber | 100 |
| Synthetic rubber | 20 |
| Softener | 1 |
| Zinc oxide | 5 |
| Double salt (as above) | 35 |
| Phenol formaldehyde | 4.5 |

*Example 4*

| | Parts |
|---|---|
| Rubber | 100 |
| Synthetic rubber | 20 |
| Softener | 1 |
| Zinc oxide, active | 5 |
| Double salt (as above) | 35 |
| Cresol resin modified with 1 part of a terpene cut with at least 10 carbon atoms | 1.5 |

I claim:

1. A multi-layer, cold-vulcanizing dry-repair body for rubber articles in the form of a patch having a main body containing vulcanized rubber and a connecting layer, in which the connecting layer comprises a mixture of unvulcanized, vulcanizable natural rubber and unvulcanized, vulcanizable synthetic rubber, in which are admixed a phenol-formaldehyde resin and as accelerator a double salt consisting of a dithiocarbamate and an organic alkali.

2. A dry-repair body according to claim 1, in which the unvulcanized synthetic rubber of the connecting layer is one of the mixed crystalline polymer groups consisting of polybutylene, polymethylbutylene, polychlorobutylene, the copolymer of isobutylene and isoprene, and a copolymer of isobutylene and butadiene and from 0.5 to 40% based on the natural rubber.

3. A dry-repair body according to claim 2, in which the accelerator of the connecting layer is a double salt consisting of zinc ethylphenyldithiocarbamate and cyclohexylethylamine and is admixed in a concentration of from 15 to 50%, based on the natural rubber.

4. A dry-repair body according to claim 3, in which the resin consist of a phenol-formaldehyde condensation product in an admixture of from 0.75 to 10%, based on the natural rubber.

5. A dry-repair body according to claim 1, in which the admixed condensation resin is a cresol resin.

6. A dry-repair body according to claim 5, in which the condensation resin is modified with a terpene containing approximately 10 C-atoms.

7. A dry-repair body according to claim 6, in which a terpene with at least 10 carbon atoms is used as a plasticizing agent.

8. A dry-repair body according to claim 1, in which the admixture is strengthened by silicic acid as a filler.

9. A dry-repair body according to claim 8, containing from 0.5 to 4% of precipitated silicic acid and a small proportion of calcium silicate.

10. A dry-repair body according to claim 1, in which a further layer consisting of unvulcanized rubber with an admixture of tetramethylthiuram disulphide in a concentration of from 0.2 to 2%, based on the rubber, is placed between the connecting layer and the main body.

11. A multi-layer, cold-vulcanizing dry-repair body for rubber articles in the form of a patch having a main body containing vulcanized rubber and a connecting layer, in which the connecting layer comprises a mixture of unvulcanized, vulcanizable natural rubber and unvulcanized, vulcanizable synthetic rubber, in which are admixed zinc oxide, a phenol-formaldehyde resin and as accelerator a double salt consisting of a dithiocarbamate and an organic alkali.

12. A multi-layer, cold-vulcanizing dry-repair body for rubber articles in the form of a patch having a main body containing vulcanized rubber and a connecting layer comprising a mixture of unvulcanized, vulcanizable natural rubber, from 0.5 to 40% of unvulcanized, vulcanizable synthetic rubber based on the amount of natural rubber, in which are admixed in percentages based on the amount of natural rubber from 0.75 to 10% of synthetic resin, from 2 to 5% zinc oxide and from 15 to 50% of a double salt consisting of a dithiocarbamate and an organic amine.

References Cited in the file of this patent

UNITED STATES PATENTS

| | | |
|---|---|---|
| 2,320,718 | Corkery et al. | June 1, 1943 |
| 2,442,083 | Hall et al. | May 25, 1948 |
| 2,638,955 | Gruber | May 19, 1953 |
| 2,760,894 | Wolf | Aug. 28, 1956 |
| 2,775,537 | Wilson et al. | Dec. 25, 1956 |
| 2,803,283 | Gruber | Aug. 20, 1957 |
| 2,963,462 | Braidwood | Dec. 6, 1960 |